United States Patent [19]

Slage

[11] Patent Number: 5,516,496
[45] Date of Patent: May 14, 1996

[54] METAL AND FLUORINE VALUES RECOVERY FROM FLUORIDE SALT MATRICES

[75] Inventor: Randall P. Slage, Elizabethton, Tenn.

[73] Assignee: Advanced Recovery Systems, Inc., Erwin, Tenn.

[21] Appl. No.: 457,261

[22] Filed: Jun. 1, 1995

[51] Int. Cl.$^6$ ................................................... G01F 1/00
[52] U.S. Cl. ........................ 423/20; 423/158; 423/178; 423/490; 423/253
[58] Field of Search ........................ 588/18, 19; 423/11, 423/20, 253, 158, 178, 490

[56]   References Cited

U.S. PATENT DOCUMENTS

| | | | |
|---|---|---|---|
| H59 | 5/1986 | Kreuzmann et al. | 423/490 |
| 2,733,126 | 1/1956 | Spiegler | 423/20 |
| 4,564,507 | 1/1986 | Elliott | 423/5 |
| 4,689,178 | 8/1987 | Gay et al. | 252/626 |
| 4,874,599 | 10/1989 | Gay et al. | 423/490 |
| 5,207,999 | 5/1993 | Burk et al. | 423/258 |

Primary Examiner—Ngoclan Mai

[57]   ABSTRACT

The process for converting feed materials of high mineral content and substantial radioactivity levels to concentrated radionuclide products of high radioactivity levels and to other products of discard or very low radioactivity levels, wherein the feed materials consists of a difficultly soluble matrix contain substantial metal, fluorine, and radionuclide values assaying above about 30 pCi/g, the process having the steps of contacting the feed materials with high temperature steam of from about 200° C. to about 1500° C., the contacting being carried out such as to convert the metal and radionuclide values to oxide residues at commercially acceptable rates and to evolve gaseous fluorides from the feed, digesting the oxide residues in an acidic digest medium separating the radionuclide values from the resulting digest liquor and subsequently isolating the metal values from the resulting raffinate whereby the metal values have a radionuclide value assay of less than about 20% of the radioactivity level of the feed materials.

9 Claims, 1 Drawing Sheet

METAL AND FLUORINE VALUES RECOVERY FROM FLUORIDE SALT MATRICES

FIELD OF THE INVENTION

This invention concerns the production of prime metal values from their fluoride salts employing metallic reducing agents, and further concerns the treatment of the redox by-product matrices for recovering therefrom the reducing metal and fluoride values, and, if desired, further prime metal values, in purified form. In a particular embodiment, the invention concerns a process for converting refractory uranium-contaminated magnesium fluoride, generally considered as low-level radioactive waste, from the uranium metal manufacturing process, to a fully decontaminated, useable magnesium product salt, to purified fluorine values, to recoverable radioactive concentrate, and to a decontaminated raffinate stream amenable for recycle. More particularly, the invention focuses on a decomposition of a magnesium fluoride matrix with high temperature steam, hydrometallurgical processing of the residue, and subsequent recovery of fluorine and metal values.

BACKGROUND OF THE INVENTION

The production of certain metals, such as uranium, is typically done by the reduction of the metal fluoride salt. For example, the reaction of magnesium metal with greensalt ($UF_4$) produces magnesium fluoride ($MgF_2$) and uranium metal. An analogous reduction process is also used for production of beryllium metal and can further be employed, in the production of practically any metal including e.g., hafnium, titanium, and zirconium. The redox products are comprised principally of a metal and an alkaline earth fluoride.

The magnesium fluoride invariably emerges from the above reaction with some level of contained uranium contamination, generally exceeding about 30 pCi/g in the case of uranium metal production. The magnesium fluoride typically contains up to about 4.0 wt. % uranium within the matrix and is a highly refractory, i.e., relatively insoluble matrix containing a variety of uranium chemical forms and oxidation states. Such matrix is generally classified as a low-level nuclear waste and must be disposed of at a licensed radioactive disposal site. As such the magnesium fluoride per se, even though not a radionuclide, represents a large liability in terms of disposed costs.

The processing of magnesium fluoride waste by-products to extract and concentrate uranium and recover magnesium and in substantially fluorine purified form for further industrial use would reduce this liability if the processing procedure were cost effective. Typically, however, magnesium fluoride processing techniques have involved a variety of acid digestions using both inorganic and organic types, both separately and in combination, in the attempt at dissolution of the refractory matrix and release of contained metals and other values. Although a fair fraction of material can be dissolved, there still remains a substantial residue containing uranium values significantly in excess of radioactive limits established by Federal Regulations for non-radioactive waste disposal.

DISCUSSION OF THE PRIOR ART

Heretofore, an integrated system dedicated to solving the aforestated problem in an efficient manner has not been directly addressed as will become evident from the following discussion concerning specific prior processing systems for these waste tailings.

In U.S. Statutory Invention Registration Number H59, a process is disclosed for decomposing magnesium fluoride in the presence of calcium oxide, calcium hydroxide, or calcium carbonate at a temperature of at least 1,600° F. A final mixture of magnesium oxide and calcium fluoride are produced, from which magnesium oxide is removed from the calcium fluoride using an acid dissolution and filtration. The resulting calcium fluoride is dried and becomes potentially useful for the manufacture of HF by conventional processing. It is apparent that the principal objectives of this prior procedure, and the complexity of the steps involved, are quite different from applicant's and as will become more evident hereinafter.

In U.S. Pat. No. 4,539,187, a method is discussed for separating and recovering metals such as aluminum, iron, silicon, etc., from flyash or like materials by reacting it with fluorosilicic acid and aqueous hydrofluoric at elevated temperatures. Subsequent operations include separating out insoluble metal fluorides and silicofluorides, and capturing and reacting the silica fluoride with water to form pure silicon and hydrogen fluoride, both for recovery. In this process, aluminum and iron fluorides may be separated from one another for eventual recovery of respective metal values. Applicant's process is quite different in many respects, e.g., in Applicant's process hazardous fluorine-bearing acids for digesting feed sediments is not used to degrade the matrix for eventual extraction and recovery of contained components.

In U.S. Pat. No. 3,880,770, a process is described for manufacturing luminescent materials containing magnesium and gallium, whereby a source of fluorine is introduced and heated with other raw metal oxide materials in a humidified, oxidizing atmosphere followed by reheating in a mildly reducing atmosphere, both for set time periods. These procedures are noted to improve the luminescence efficiency of the resulting phosphor, which is a magnesium, manganese, aluminum, gallium, oxide. The objectives and procedures of the present invention are very different, as will become further evident.

OBJECTS OF THE INVENTION

Principal objects, therefore, of the present invention are: to provide a markedly simplified and efficient process for recovering substantial fluorine and metal values, particularly radionuclide values, especially uranium, from refractive magnesium fluoride by-products, where refractive magnesium fluorides are converted to highly acid soluble magnesium oxide without using decomposing calcium salts or other materials which leave residues or by-products which present disposal problems; to provide such a process where fluorides are recovered in purified gaseous or liquid form for simplified recycle to the prime metal manufacturing process; and to provide such a process wherein magnesium can be recovered as a high value, decontaminated salt with <30 pCi/g activity for metal manufacturing.

SUMMARY OF THE INVENTION

These and other objects hereinafter appearing have been attained in accordance with the present invention which, in a preferred, principal embodiment, is defined as a process for converting feed materials of high mineral content and substantial radioactivity levels to concentrated radionuclide products of high radioactivity levels and to other products of discard or very low radioactivity levels, wherein said feed materials are refractory and contain substantial metal, fluorine, and radionuclide values assaying above about 30 pCi/g, said process comprising contacting said feed materials with high temperature steam from about 200° C. to about 1500° C., preferably from about 800° C. to about 1300° C., said contacting being carried out such as to convert said metal and radionuclide values to oxide residues at commercially acceptable rates and to evolve gaseous fluorides from said feed, digesting said oxide residues in a digest medium wherein the radio of digest medium in liters (L) to oxide residue in kilogram (KG) is from about 1/1 to 40/1, preferably from about 2/1 to about 20/1, selectively separating said radionuclide values from the resulting digest liquor and isolating said metal values from the resulting raffinate whereby said metal values have a radionuclide value assay of less than about 20% of the radioactivity level of said feed materials.

In certain other preferred embodiments:

(a) the feed materials comprise alkaline earth residues containing either or both of calcium or magnesium fluoride matrices,, the said contacting being of sufficient duration to convert all metallic feed elements to oxide form and to collect all fluoride as hydrogen fluoride, and wherein the oxides are dissolved in an acidic medium to create a digest liquor from which radionuclides and metal values can be selectively separated; and (b) wherein the separation of the radionuclide is achieved by solvent extraction.

BRIEF DESCRIPTION OF THE DRAWING

The invention will further understood from the drawing herein, where.

DETAILED DESCRIPTION OF THE INVENTION

Figure 1:
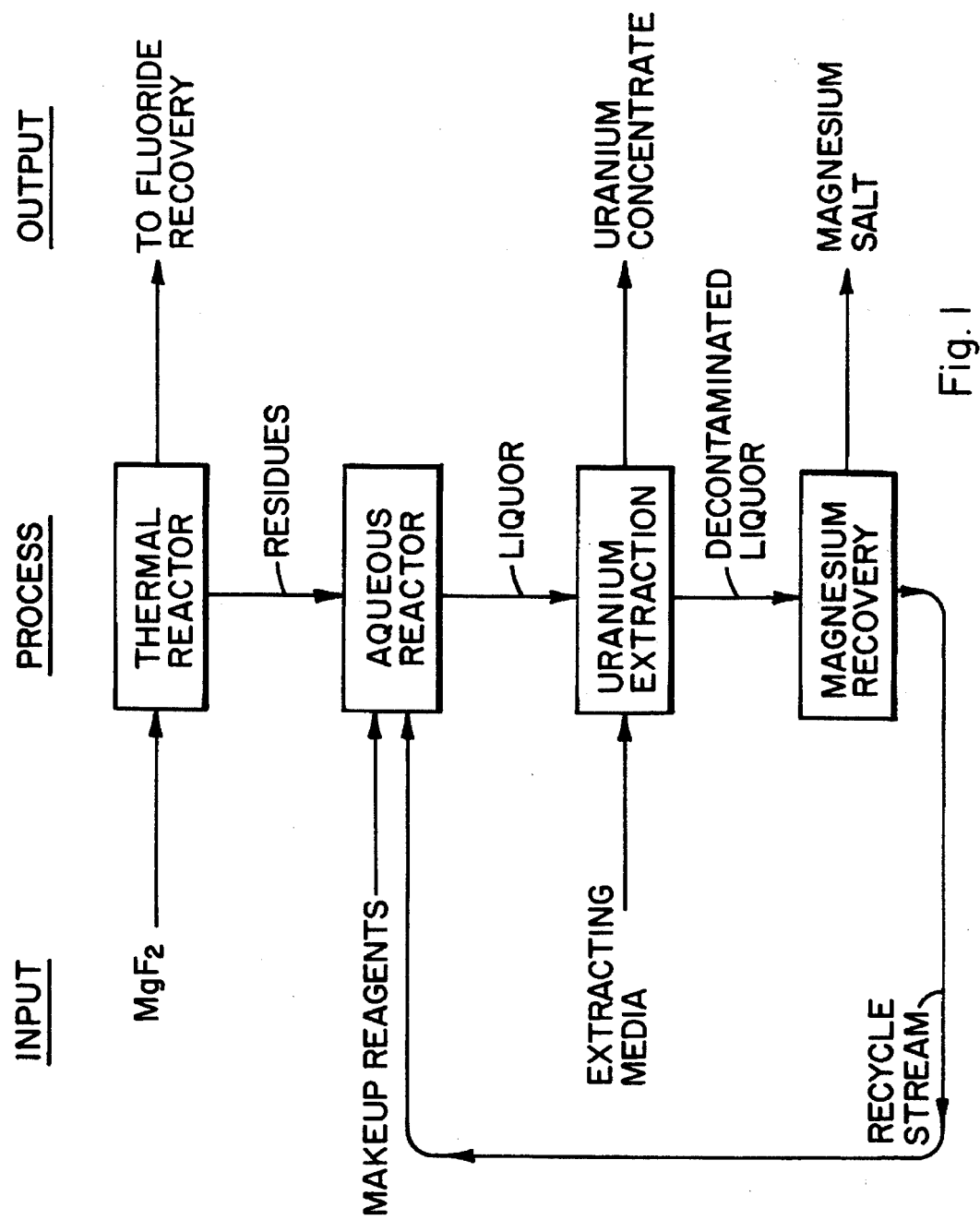
FIG. 1 is a schematic flowsheet for the present overall process.

In the manufacture of metals such as uranium and beryllium and the like, hereinafter, prime metals, certain alkaline earth metals have been used as reducing agents by reacting them with the prime metal fluoride intermediates in a redox system to produce the prime metal product. In the case of uranium, the hexafluoride intermediate compound thereof is first reduced by hydrogen to produce $UF_4$, known as greensalt, and hydrofluoric acid, i.e., (1) $UF_6 + H_2 \rightarrow UF_4 + 2HF$. 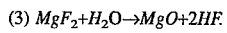

The greensalt is subsequently reacted with magnesium or calcium metal to produce magnesium or calcium fluoride and uranium metal, i.e., (2) $UF_4 + M_g \rightarrow MgF_2 + U_{(s)}$. 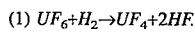

Although the products become separated in the above reaction (2), the magnesium fluoride invariably emerges from the process with a fraction of uranium that is trapped inside the refractory fluoride matrix. This matrix is difficult to process and becomes a low-level radioactive waste disposal cost liability.

The uranium concentration in the magnesium fluoride matrix can vary considerably, however, typically the matrix composition is about 38% magnesium, about 58–59% fluoride and 1–2% uranium. Higher or lower levels of these constituents occur depending upon operational efficiency or the like.

In the present invention, as indicated by FIG. 1, the magnesium fluoride is treated with high temperature carrier steam to begin the process. The temperature of the steam is preferably around 1000° C. or higher, but could be as low as about 200° C. and as high as about 1300° C. The fluorine atoms are efficiently desorbed to the steam, with the reaction usually becoming complete in from about five to about ten hours. The fluorine in the matrix is mobilized to the steam and converts to hydrogen fluoride, which is subsequently condensed and collected. This reaction is represented as follows:

(3) $MgF_2 + H_2O \rightarrow MgO + 2HF$. 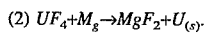

additional unit operations may be invoked at this point to further purify the hydrogen fluoride and/or to create an anhydrous hydrogen fluoride from it. The hydrogen fluoride becomes a recyclable product. It is noted that by adding a cation reactive agent, e.g., such as aluminum hydroxide, $Al_2O_3 \cdot 3H_2O$, calcium, oxide or the like to the mobilized fluoride stream, other valuable fluoride compounds can be synthesized in addition to HF, such as aluminum fluoride, $AlF_3$, calcium fluoride, $CaF_2$, and analogous.

The residue solids remaining are principally magnesium and uranium oxides with minor other non-strippable impurities. These solids contain the bulk of the uranium from the magnesium fluoride pyrohydrolysis and can be dissolved essentially completely in a variety of acids such as hydrochloric, nitric, or sulfuric, or mixtures thereof to produce dissolved magnesium and uranium salts. An advantage of this process is that at most, only a minute fraction of the residual solids are insoluble, i.e., generally <1% as will be shown by the examples herein. Another advantage is that refractor uranium material is converted to the more soluble oxidation estate, and is readily soluble in acidic medium. Exemplary dissolution reactions for the residue solids employing hydrochloric acid are as follows:

(4) $MgO + 2HCl = Mg^{+2} + 2Cl^- + H_2O$; and 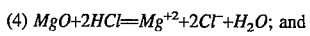

(5) $UO_3 + 2HCl = UO_2^{+2} + 2Cl^- + H_2O$. 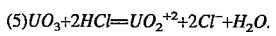

Analogous reactions occur in the dissolution of the solids in either sulfuric or nitric acids. The initial concentrations of the acidic medium can range, e.g., from about 1.0 to about 12.0 molar, with from about 4.0 to about 8.0 molar being preferred.

Once dissolved in acidic liquor, the uranium may be selectively extracted therefrom and from the magnesium by any of a variety of solvent extraction systems to produce very low levels of uranium in the raffinate (extracted liquor). The extraction may be carried out multiple times by the appropriate solvent to enhance the extraction efficiency. This solvent is then contacted, preferably multiple times, with a stripping agent to re-extract uranium into a desired material. The stripped solvent is then returned for further use in the extraction procedure.

Useful extraction solvents include the myriad of those disclosed in the literature such as n-tributyl phosphate in kerosene, DEHPA/TBP combinations, trioctylophosphine oxide in kerosene, or any of a variety of amines.

The uranium-free liquor or raffinate is now subjected to a magnesium salt recovery phase. The salt may be recovered in purified form by any of several techniques. For example, raffinate may be evaporated to produce uranium-free crystals of a magnesium salt of the acid anion.

Alternatively the extracted liquor may be contacted with the recovered hydrogen fluoride solution from the thermal desorption, and the pH adjusted with, for example, ammonium carbonate, until magnesium fluoride is regenerated. The adjusted pH generally would be about 7, but may be in the 1 to 12 range. A solid forms which is principally uranium-free magnesium fluoride. This solid is then filtered from the slurry and washed with water. The resulting cake is heated, e.g., at about 110° C. to remove surface waters and at, e.g., about 700° C. to remove bound waters. The resulting cake is discharged and either recycled or disposed of as a radioactive free salt.

It is noted that beryllium metal is also produced by a reducing reaction analogous to (2) about, i.e., (6) $BeF_2 + Mg(s) = MgF_2 + Be(s)$.

The flowsheet in FIG. 1 is generally applicable for extracting other metals such beryllium from magnesium fluoride. Invariably, the magnesium fluoride contains concentrations of beryllium, which are considered as hazardous materials. In this case, the beryllium contaminated magnesium fluoride would be thermally treated as above to first form magnesium oxide, which subsequently would be dissolved in an acidic digest medium for subsequent extraction of the beryllium. The magnesium salt is recovered in a manner similar to that described above.

| Ranges | Thermal Process | Preferred |
|---|---|---|
| T° | 200° C.–1500° C. | 800° C.–1300° C. |
| Time | 2–10 hours | 4–6 hours |
| Molarity | N/A | N/A |
| Solids (Kg/L) | N/A | N/A |
| Ranges | Digestion | Preferred |
| T° | Ambient 90° C. | 75° C.–85° C. |
| Time | 0.5–6.0 hours | 1–3 hours |
| Molarity | 1–12 | 4–8 |
| Solids (Kg/L) | 1:1–1:40 | 1:2–1:7 |
| Ranges | Extraction | Preferred |
| T° | Ambient | Ambient |
| Time | 1–30 minutes | 2–4 minutes |
| Molarity | — | — |
| Solids (Kg/L) | — | — |

EXAMPLE A

THERMAL TREATMENT OPERATION

A magnesium fluoride residue resulting from the manufacture of uranium metal was processed in accordance with the present invention. The assayed composition of the residue by weight was about 97–98% magnesium fluoride and about 1.7% uranium. The residue was treated by thermal desorption using steam as a carrier, at about 1100° C. The purpose of the treatment was to remove fluoride from the material leaving a residue that could be readily dissolved so that the uranium could be removed by solvent extraction and the magnesium reprecipitated with the removed fluoride to produce a uranium-free magnesium oxide.

In performing the above, a quantity of 79.9 grams of magnesium fluoride residue was placed in a furnace at 1100° C. and steam passed over the sample so as to collect about 160 ml of condensate in one hour. The sample was treated for about 9 hours. A total of 2920 ml of condensate was collected containing 47.1 grams of fluoride. The residue was 52.2 grams assaying at 58.16% magnesium and 2.61% uranium.

EXAMPLE B

DISSOLUTION OF MAGNESIUM RESIDUES

A 40.0 gram aliquot of the above treated residue was dissolved in 150 ml of concentrated nitric acid and 450 ml of water in about 15 minutes at 80°–90° C. The digest solution was filtered, the residue was washed with about 20 ml of water, and the residue dried to a total of 0.06 grams. The aqueous raffinate solution volume was 620 ml with a magnesium concentration of about 37.525 ppm and a uranium concentration of about 1684 ppm.

EXAMPLE C

EXTRACTION OF URANIUM

The 620 ml of raffinate solution was added to 600 ml of 15%v/v of TBP-in-kerosene (solvent) and mixed for 2 minutes. The aqueous phase was drained off and the solvent was stripped with 612 ml of water. The aqueous strip solution was drained off and analyzed to give a magnesium concentration of 46 ppm and a uranium concentration of 1679 ppm. The raffinate solution was 620 ml with substantially the same magnesium concentration both with a uranium concentration of only 8.7 ppm. A 610 ml aliquot of the once-extracted raffinate solution was added to the stripped solvent and mixed for 2 minutes. The aqueous phase was drained off and analyzed to give a magnesium concentration of about 37.885 ppm and a uranium concentration of 0.9 ppm.

EXAMPLE D

RECONSTITUTION OF MAGNESIUM SALT

A 600 ml aliquot of the twice-extracted digest (raffinate) solution was added to 2870 ml of the fluoride contained in 3950 ml of water. The pH of the solution was adjusted to 7 with ammonium carbonate. The solution was filtered and the filter cake dried at 100° C. overnight and at 700° C. for 2 hours. The residue totaled 54.1 grams with a magnesium concentration of 38.46%, a fluoride concentration of 61.98%, and a uranium concentration of 6 ppm (2.4 pCi/g). Based on these results, 99% of the uranium was removed from the magnesium fluoride and recovered in the strip solution, and essentially a 100% magnesium fluoride product with <30 pCi/g uranium activity was generated using the original magnesium and fluoride values.

EXAMPLE E

PREPARATION OF MAGNESIUM CHLORIDE LIQUOR

A quantity of 5.6 rams of the residue produced in Example A from thermal treatment of contaminated magnesium fluoride was mixed with 200 ml of 6.8 molar hydrochloric acid. Several drops of 30% hydrogen peroxide were then added to this mixture. The mixture was stirred and heated for about 3 hours until nearly all of the solids appeared to be dissolved. The resulting solution was filtered. The filtrate measured about 180 ml. The filtered solids weighed 0.1 grams, indicating that 98.2% of the residue dissolved in the hydrochloric acid.

EXAMPLE F

EXTRACTION OF URANIUM FROM MAGNESIUM CHLORIDE LIQUOR

The 180 ml of filtrate from Example E, containing about 800 ppm uranium, was contacted thee times with 180 ml of fresh 15% by volume (15 v/v) of n-tributylphosphate (TBP) in kerosene. Contact times were for a minimum of 2 minutes. The resulting third raffinate contained <1 ppm uranium, indicating that > 99.8% of the uranium was extracted from the liquor.

EXAMPLE G

SYNTHESIS OF DECONTAMINATED MAGNESIUM CHLORIDE SALT

Approximately 170 ml of third raffinate generated in example F was boiled gently for about 4 hours to a volume of about 30 ml. At this point, significant crystallization of salt occurred. The crystals were filtered from the liquid and dried at 90° C. for about 16 hours. The weight of the crystals was 19.6 grams. An aliquot of these crystals was dissolved in deionized water and analyzed for magnesium, chlorine, and uranium. The analytical data was: 13.9% Mg, 36.3% chlorine and <0.002% uranium, indicating that principally $MgCl_2 \cdot 6H_2O$, containing greatly reduced radioactivity, was synthesized. Over 80% of the magnesium input to the dissolution and extraction processes discussed previously was recovered at a chloride salt.

The invention has been described in detail with particular reference to preferred embodiments thereof, but it will be understood that variations and modifications will be effected with the spirit and scope of the invention.

I claim:

1. The process for converting feed materials of high mineral content and substantial radioactivity levels to concentrated radionuclide products of high radioactivity levels and to other products of discard or very low radioactivity levels, wherein said feed materials comprises a difficulty soluble matrix contain substantial metal, fluorine, and radionuclide values assaying above about 30 pCi/g, said process comprising contacting said feed materials with high temperature steam of from about 200° C. to about 1500° C., said contacting being carried out such as to convert said metal and radionuclide values to oxide residues at commercially acceptable rates and to evolve gaseous fluorides from said feed, digesting said oxide residues in an acidic digest medium, separating said radionuclide values from the resulting digest liquor and subsequently isolating said metal values from the resulting raffinate whereby said metal values have a radionuclide value assay of less than about 20% of the radioactivity level of said feed materials.

2. The process of claim 1 wherein said radionuclide values are principally uranium values.

3. The process of claim 2 wherein said feed materials contain substantial amounts of either magnesium fluoride or calcium fluoride.

4. The process of claim 1 wherein the ratio of digest medium (L) to oxide residue (KG) is from about 1/1 to about 40.

5. The process of claim 1 wherein gaseous fluoride generated from the feed is recovered as hydrofluoric acid.

6. The process of claim 1 wherein a cation reactive reagent is added to the recovered fluoride stream to produce a metal fluoride product.

7. The process of claim 1 wherein the digest medium consists of an acid selected from the group selected from acids or a mixture of said acids.

8. The process of claim 7 wherein said acids are selected from hydrochloric, sulfuric, nitric, boric, citric, oxalic, or carbonic.

9. The process of claim 1 wherein said separated metal values are chlorides or sulfates of magnesium or calcium.

* * * * *

UNITED STATES PATENT AND TRADEMARK OFFICE
CERTIFICATE OF CORRECTION

PATENT NO.   : 5,516,496

DATED        : 05/14/96

INVENTOR(S)  : Randall P. Slagle

It is certified that error appears in the above-identified patent and that said Letters Patent is hereby corrected as shown below:

Column 8,
Claim 1, line 5, delete "comprises" and insert ---comprise---;
        line 6, delete "contain" and insert ---containing---;
        line 17, delete "value" and insert ---values---;

Signed and Sealed this

Twenty-seventh Day of August, 1996

Attest:

BRUCE LEHMAN

*Attesting Officer*    *Commissioner of Patents and Trademarks*

REEXAMINATION CERTIFICATE (3654th)
United States Patent [19]
Slage

[11] B1 5,516,496
[45] Certificate Issued Oct. 27, 1998

[54] METAL AND FLUORING VALUES RECOVERY FROM FLUORIDE SALT MATRICES

[75] Inventor: Randall P. Slage, Elizabethton, Tenn.

[73] Assignee: Advanced Recovery Systems, Inc., Erwin, Tenn.

Reexamination Request:
No. 90/004,788, Oct. 3, 1997

Reexamination Certificate for:
Patent No.: 5,516,496
Issued: May 14, 1996
Appl. No.: 457,261
Filed: Jun. 1, 1995

Certificate of Correction issued May 14, 1996.

[51] Int. Cl.$^6$ .................................................. G01F 1/00
[52] U.S. Cl. .................... 423/20; 423/158; 423/178; 423/490; 423/253
[58] Field of Search .................... 588/18, 19; 423/11, 423/20, 158, 178, 253, 490

[56] References Cited

U.S. PATENT DOCUMENTS 2,733,126  1/1956  Spiegler .................................. 423/20
4,874,599  10/1989  Gay et al. .............................. 423/490

OTHER PUBLICATIONS

Elliott, B., Proces Development Quarterly Report Part I—Laboratory Work, Mallinckrodt Report No. MCW–1403, Jul. 1957 pp. VII–57–VII–61.

Mallinckrodt Chemical Works Process Development Quarterly Report No. MCW–1403 (1957).

Robert C. Merritt, *The Extractive Metallurgy of Uranium*, Colorado School of Mines (1971) pp. 30–32.

Joseph J. Katz & Glenn T. Seaborg, *The Chemistry of the Actinide Elements* (1957) pp. 198–199.

Andrea E. Talbot et al., ed., *Science and Technology of Tributyl Phosphate*, vol. 1 (1984) pp. 172–177.

*Primary Examiner*—Ngoclan T. Mai

[57] ABSTRACT

The process for converting feed materials of high mineral content and substantial radioactivity levels to concentrated radionuclide products of high radioactivity levels and to other products of discard or very low radioactivity levels, wherein the feed materials consists of a difficultly soluble matrix contain substantial metal, fluorine, and radionuclide values assaying above about 30 pCi/g, the process having the steps of contacting the feed materials with high temperature steam of from about 200° C. to about 1500° C., the contacting being carried out such as to convert the metal and radionuclide values to oxide residues at commercially acceptable rates and to evolve gaseous fluorides from the feed, digesting the oxide residues in an acidic digest medium separating the radionuclide values from the resulting digest liquor and subsequently isolating the metal values from the resulting raffinate whereby the metal values have a radionuclide value assay of less than about 20% of the radioactivity level of the feed materials.

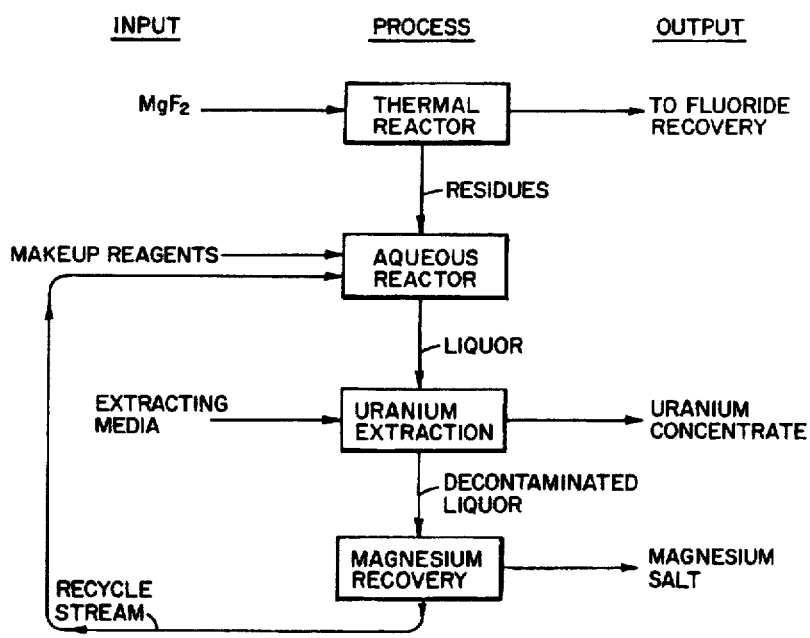

B1 5,516,496

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

\* \* \* \* \*